United States Patent [19]
Guichard et al.

[11] Patent Number: 5,008,924
[45] Date of Patent: Apr. 16, 1991

[54] TELECOMMUNICATIONS TERMINAL WITH IMPROVED CONTROL FUNCTIONS

[75] Inventors: Jacques Guichard; Georges Buchner, both of Paris; Jacques Labat, Chatillon, all of France

[73] Assignee: Etat Francais, Issy les Moulineaux, France

[21] Appl. No.: 384,495

[22] Filed: Jul. 24, 1989

[30] Foreign Application Priority Data

Jul. 25, 1988 [FR] France ................... 88 10003

[51] Int. Cl.$^5$ ................... H04N 7/12; H04M 1/72
[52] U.S. Cl. ................... 379/53; 379/370; 379/387; 379/433; 358/85
[58] Field of Search ................... 379/53, 54, 96, 387, 379/162, 163, 165, 166, 388, 393, 397, 457, 61, 63, 370, 433, 201; 358/85

[56] References Cited

U.S. PATENT DOCUMENTS

| | | | |
|---|---|---|---|
| 3,792,205 | 2/1974 | O'Dea ................... | 379/433 |
| 4,122,304 | 10/1978 | Mallien, II ................... | 379/63 |
| 4,523,056 | 6/1985 | Fisher ................... | 379/372 |
| 4,567,332 | 1/1986 | Jamison ................... | 379/388 |
| 4,583,214 | 4/1986 | Miyashita et al. ................... | 379/166 |
| 4,646,344 | 2/1987 | Goldhorn et al. ................... | 379/445 |
| 4,856,045 | 8/1989 | Hoshina ................... | 379/96 |

FOREIGN PATENT DOCUMENTS

| | | | |
|---|---|---|---|
| 0156297 | 10/1985 | European Pat. Off. | |
| 0114055 | 6/1985 | Japan ................... | 379/388 |
| 0169055 | 7/1986 | Japan ................... | 379/388 |
| 0130047 | 6/1987 | Japan ................... | 379/388 |

OTHER PUBLICATIONS

W. B. Cagle et al., "2C Video Telephone Station Set", Bell System Technical Journal, vol. 50, No. 2, Feb. 1971, pp. 271-312.

*Primary Examiner*—Jin F. Ng
*Assistant Examiner*—Wing F. Chan
*Attorney, Agent, or Firm*—Blakely, Sokoloff, Taylor & Zafman

[57] ABSTRACT

A telecommunications terminal is provided which has a central unit (100) and a handset (200). The handset houses a microphone (210) and a speaker (220) and is connected to the central unit via a cord (300). The connecting cord has a plurality of wires (301-304) for conveying output signals from the microphone and input signals to the speaker. The telecommunications terminal incorporates at least one function under the manual control of its user. That function is controlled by a switching means (11, 12; 230) housed in the handset, with the corresponding control signals being conveyed along said cord in the form of phantom D.C. voltages.

5 Claims, 2 Drawing Sheets

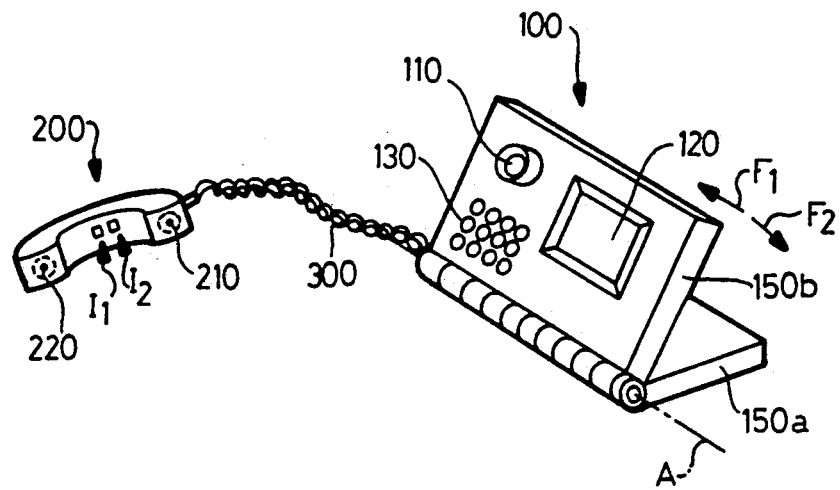
FIG_1
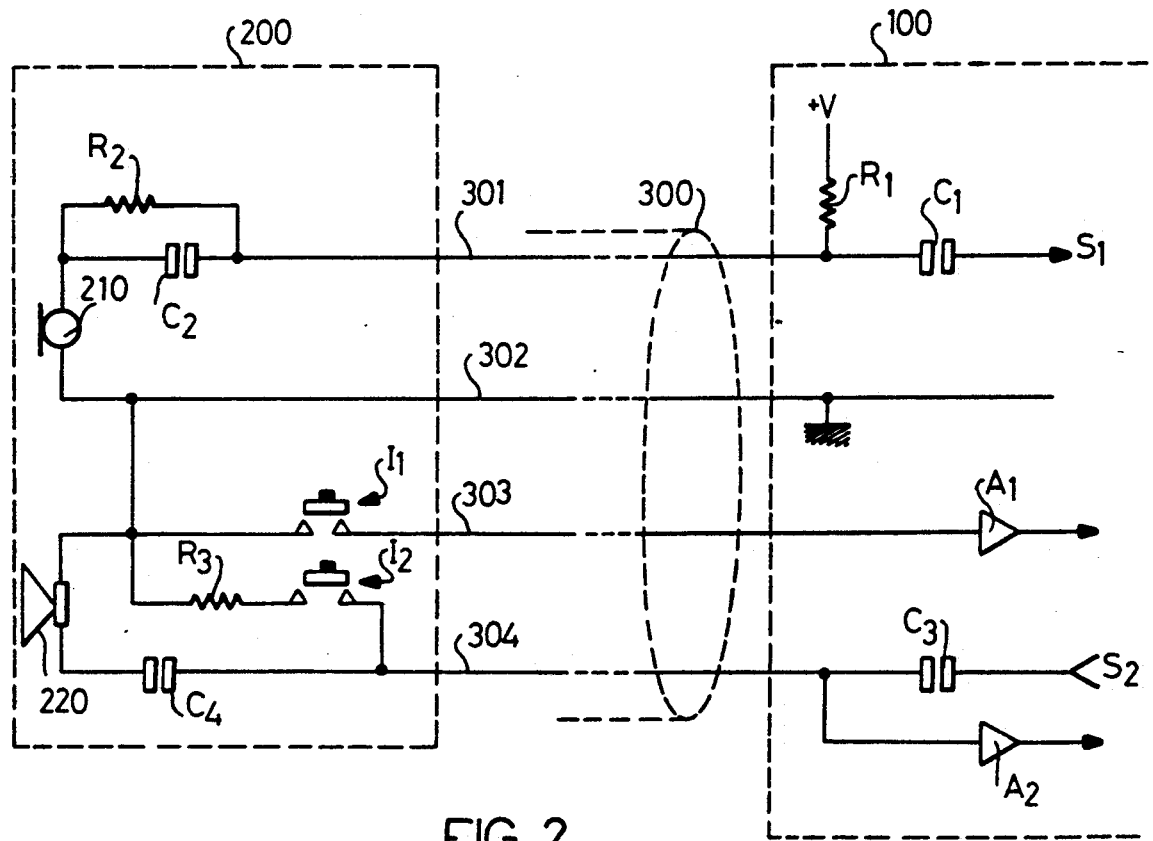
FIG_2

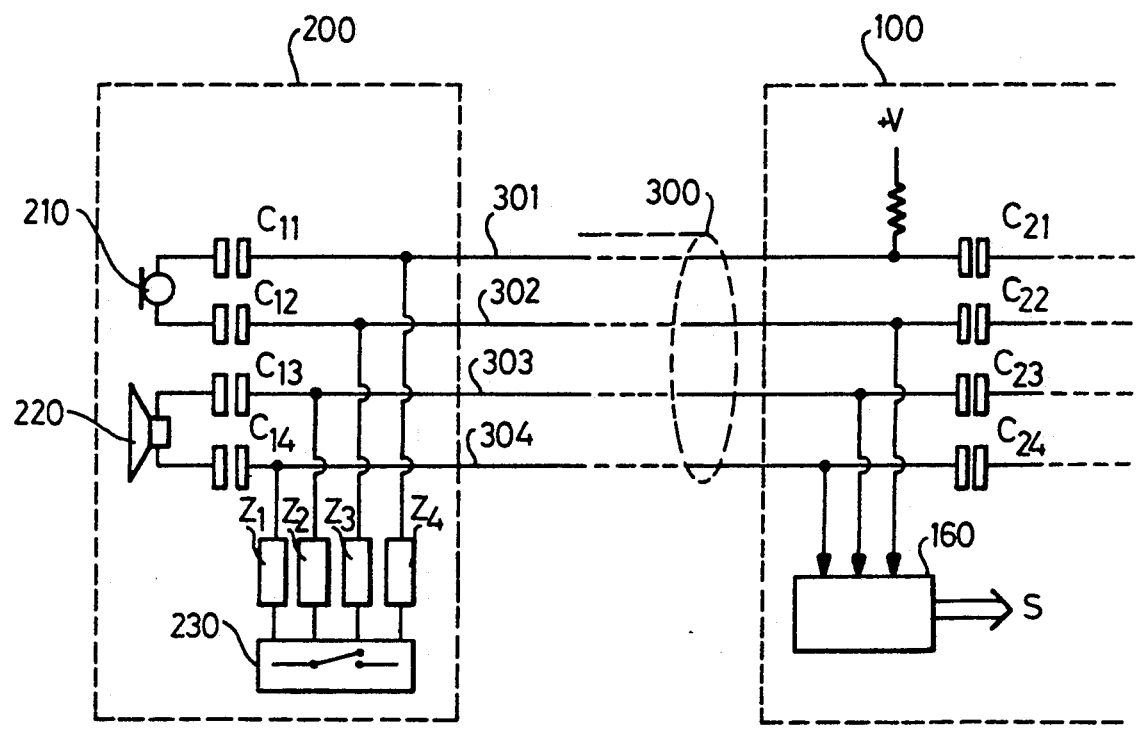
FIG_3

TELECOMMUNICATIONS TERMINAL WITH IMPROVED CONTROL FUNCTIONS

BACKGROUND OF THE INVENTION

The present invention relates in general to telephony and videophony, and it relates more particularly to an improved device for facilitating user control of the functions of a telephone or a video phone.

During a video phone call, it is important for the caller to remain relatively stationary relative to the video phone camera in order to ensure that the distant party receives an image of adequate quality, and in particular an image which can be watched under optimum conditions without fatigue and without difficulty.

However, during a video phone call, one of the parties may need to perform control operations by acting, for example, on moving parts or keys of the video phone.

For example, if the video phone is fitted with a manual image-framing system, a party may need to change the direction in which the camera is pointing in order to change his or her own framing, or else a party may desire to change the brightness or contrast settings of the display screen or of the video phone, etc., or the party may desire to put the installation in a so-called "hands-free" position by pressing on an appropriate key of the terminal.

Such user actions are undesirable insofar as they degrade the viewing comfort of the other party.

In particular, a user may need to move close to the terminal, such that the user's face comes too close to the camera. The image is then degraded It is also possible that a user may pass a hand through the field of the camera and very close to the camera when performing such a manipulation or adjustment. This causes the image received by the distant party to be temporarily masked either completely or in part, and naturally this is undesirable. Finally, a user may leave the camera field in order to perform some operation.

SUMMARY OF THE INVENTION

The present invention seeks to mitigate these drawbacks of the prior art and to provide a function control device for a video phone or the like enabling the user to continue being correctly framed throughout.

To this end, the present invention provides a telecommunications terminal of the type comprising a central unit and a handset comprising a microphone and a speaker connected to said central unit via a cord having a plurality of wires conveying the output signals from the microphone and the input signals to the speaker, said terminal incorporating at least one function under manual control of its user, the terminal being characterized in that said at least one function is controlled by switching means housed in the handset, with the corresponding control signals being conveyed along said cord in the form of phantom D.C. voltages.

Preferred aspects of the telecommunications terminal of the invention are the following:

the switching means comprise two pushbutton switches suitable for connecting the speaker feed wires to ground;

the two switches control forward and reverse motion of a motor for driving a moving portion of the central unit, said moving portion carrying said camera, thereby enabling the image of the user to be framed;

one of the wires in the cord conveys a reference voltage to the handset, and the switching means comprise a set of keys associated with a logic circuit, such that each key corresponds to a given combination of voltages on the other wires, which combination determines the control of a given function;

the cord contains four wires and conveys up to eight different control signals; and at least some of the wires are D.C. isolated from the microphone, from the speaker, and from the associated circuits of the central unit by means of capacitors.

BRIEF DESCRIPTION OF THE DRAWINGS

Other aspects, objects, and advantages of the present invention appear more clearly on reading the following detailed description of a preferred embodiment thereof given by way of example and with reference to the accompanying drawings, in which:

FIG. 1 is a diagrammatic perspective view of a terminal in accordance with the present invention;

FIG. 2 is a diagram of one example of a function control circuit for said terminal; and FIG. 3 is a block diagram of another function control circuit in accordance with the circuit.

DESCRIPTION OF THE PREFERRED EMBODIMENTS

With reference initially to FIG. 1, a sound and vision telecommunications terminal of the video phone type comprises a central unit 100 which is shown diagrammatically and which is equipped with a camera 110, a display screen 120, a key pad 130, and a handset support (not shown)

In the present example, the housing of the central unit comprises a base 150a and a portion 150b hinged to the base about a horizontal axis A and containing the set of functions provided by the terminal.

The terminal also includes a handset 200 which is analogous in general appearance to an ordinary telephone handset and which conventionally houses a microphone 210 and a speaker 220.

The handset 200 is connected to the central unit by means of a four-wire cord 300, likewise in conventional manner.

In the present embodiment, the terminal provides the facility whereby an appropriate electric motor and its associated control circuit (not shown) serve to cause the hinged portion 150b to be tilted selectively in either of two different directions (arrows $F_1$ and $F_2$), thereby varying the direction in which the camera 110 points and enabling image framing to be adapted to the stature or the posture of the user.

In accordance with the present invention, the means for controlling this function comprise two non-locking pushbuttons $I_1$ and $I_2$ which are mounted in the handset 200, and these pushbuttons make use, as explained in detail below, of D.C. control voltages which are conveyed along the cord 300 in the form of phantom voltages.

With reference now to FIG. 2, the handset 200 is shown comprising the microphone 210 which is connected to the terminal 100 by two wires 301 and 302 in the cord 300, and the speaker 220 which is connected to said terminal via two other wires 303 and 304.

In this case, the microphone 210 is of the electret type and it is therefore provided with phantom D.C. bias $+V$ applied over the wire 301 via a resistor $R_1$ in the central unit 100. Correspondingly, and in conventional manner, the handset 200 is provided with a resistor $R_2$ connected in parallel with a capacitor $C_2$, and a capacitor $C_1$ in the central unit isolates the D.C. from the circuit (not shown) for processing the signal generated by the microphone.

The wire 302 is connected to ground in the central unit and is connected to the wire 303 in the handset 200, as shown. A first non-locking pushbutton $I_1$ is connected in the handset in series with the wire 303, and at the central unit 100 this wire is applied to the input of a control amplifier $A_1$.

A second non-locking pushbutton $I_2$ is connected between the wires 303 and 304 and in series with a resistor $R_3$. When the switch of the pushbutton is closed, this resistor prevents the two terminals of the speaker from being short-circuited.

Respective capacitors $C_3$ and $C_4$ are provided at each of the two ends of the wire 304 in order to separate the alternating speaker signals from the D.C. type signals relating to the switch $I_2$.

Finally, a second control amplifier $A_2$ is provided in the central unit 100 with its input connected to the wire 304 upstream from the capacitor $C_3$.

In the circuit described above, the four wires, the microphone, and the speaker behave in conventional manner in association with low frequency oscillation signals $S_1$ and $S_2$ conveyed by the wires, except insofar as the speaker is fed in this case via the wires 302 and 304.

However, these wires are also used for conveying function control signals as "phantoms".

In the present example, the function under consideration consists in pivoting the hinged portion 150b of the terminal up or down, and the outputs from the control amplifiers $A_1$ and $A_2$ are connected for this purpose to a suitable control circuit for a reversible electric motor (not shown).

When both switches $I_1$ and $I_2$ are open, as shown, the inputs to both of the amplifiers $A_1$ and $A_2$ are at high impedance; as a result no current can flow through said amplifiers, thereby determining a first state thereof.

When the user presses a finger against switch $I_1$, then the input to amplifier $A_1$ is connected to ground, thereby determining a second state in which the motor is actuated in the up direction.

Similarly, when the user presses down $I_2$, the input of amplifier $A_2$ is grounded via low value resistor $R_3$. The motor is then excited in the down direction.

Returning to FIG. 1, it can be seen that the switches $I_1$ and $I_2$ are disposed on the inside face of the handset 200 substantially halfway between the microphone 210 and the speaker 220. This disposition is particularly advantageous in that it enables the user to act on one or other of the keys or pushbuttons for the switches $I_1$ or $I_2$ using the fingers of the hand which is holding the handset, thereby leaving the other hand free.

FIG. 3 is a block diagram of a different control circuit suitable for use in the context of the present invention. In this figure, items or portions which are identical or similar to those of FIG. 2 have been given the same reference numerals.

As can be seen, all four wires 301 to 304 are isolated for D.C. voltages from the microphone 210, the speaker 220, and the remainder of the terminal, by means of two sets of four capacitors $C_{11}$ to $C_{14}$ and $C_{21}$ to $C_{24}$ connected as shown.

A reference voltage $+V$ is applied to the wire 301. In the handset 200 all of the wires are connected via appropriate impedances $Z_1$ to $Z_4$ to a switching unit shown diagrammatically at 230 and preferably constituted by a key pad containing a set of pushbutton switches, e.g. eight. The purpose of these impedances is to avoid interfering with the output circuit from the microphone and the input circuit to the speaker, both of which are low impedance circuits, while nevertheless conveying D.C. voltages without significant attenuation.

Since each of the three wires 302 to 304 is capable at any moment of occupying one of two possible states, namely a "floating" state and a state in which it is raised to the voltage $+V$ via the switching unit 230 and impedances, it will be understood that these three wires are capable of conveying $2^3 = 8$ control signals.

In this respect, the switching unit 230 preferably includes a combinatory logic circuit or coder suitable for establishing a one-to-one correspondence between each of the eight keys of the key pad and a corresponding one of the eight possible voltage combinations on the wires 302 to 304. Such a circuit is advantageously in the form of a VLSI (very-large-scale integrated) programmable logic network.

The central unit 100 is provided with a similar circuit 160 which receives the D.C. signals present on the three wires 302–304 and which is suitable for decoding these signals in order to convert them into eight specific control signals (output bundle S).

Thus, according to the invention, it is possible to control various functions of a video phone type terminal or even of an ordinary telephone set without requiring the user to move about and leaving free the user's hand which is not holding the handset, without requiring any significant change in the construction of an ordinary telephone handset, and in particular while using only the four wires that are present in its connection cord, i.e. in a manner which is cheap and practical.

Examples of the functions which can be controlled in this way are as follows:

adjusting the image-framing of the user by motorized displacement of the camera or of a portion of the terminal to which it is fixed, or by motorized action on the focal length of the objective lens of said camera; correspondingly switching the terminal into a local verification mode in which the user temporarily views his- or herself on the screen for adjustment purposes;

adjusting the image displayed on the terminal, in particular its brightness, contrast, saturation, and white level;

switching to "hands-free" mode;

adjusting the sound level of amplified listening; and adjusting the brightness of auxiliary illumination provided on the terminal.

Although the above description describes the control of local mode functions, i.e. in which the user acts on various functions that have an effect on the user's terminal only, the invention is also advantageously applicable to controlling functions at the distant end. In this respect, appropriate control signals may be conveyed over the transmission network between the two terminals, e.g. over a "user-to-user signalling" channel in a network of the Integrated Digital Services Network (IDSN) type.

Naturally the person skilled in the art can add variants or modifications without going beyond the scope of the invention.

For example, such a person can readily design filters to prevent the various switching operations from generating undesirable noises in the audio channels of the microphone and the speaker.

In addition, the number of control operations possible from the handset can be increased by various different methods: in particular a system of resistor divider bridges could be used in association with the switches so that a given voltage value selected from a range of possible values on a corresponding wire is associated with control of a given function. Another solution could consist in allocating two or even more different controls to a single key, e.g. by pressing the key once in one case and twice in quick succession in the other. Finally, if the $+V$ reference voltage (see FIG. 3) is incorporated in the handset itself, e.g. by means of a battery, an additional wire is released for transmitting data to the central unit. Thus, in the case shown in FIG. 3, $2^4=16$ different controls can be obtained.

We claim:

1. A telecommunications terminal of the video phone type comprising a central unit (100) and a handset (200) comprising a microphone (210) and a speaker (220) connected to said central unit via a cord (300) having a plurality of wires (301-304) for conveying output signals from said microphone and input signals to said speaker, said terminal further comprising a camera (110) and a display means (120), said terminal being characterized in that a switching means (l1, l2, 230) housed in said handset (200) and in communication with said wires controls forward and reverse motion of a motor for driving a moving portion (150b) of said central unit, said moving portion carrying said camera, thereby enabling an image of the user to be framed, said switching means causing control signals to be conveyed along said cord in the form of phantom D.C. voltages when said switching means are engaged.

2. A terminal according to claim 1, characterized in that said switching means comprises two pushbutton switches ($I_1$, $I_2$) suitable for connecting speaker feed wires (303, 304) to ground.

3. A terminal according to claim 1, characterized in that at least some of said wires (301-304) are D.C. isolated from said microphone (210), from said speaker (220), and from the associated circuits of said central unit by means of capacitors ($C_3$, $C_4$; $C_{11}$-$C_{14}$, $C_{21}$-$C_{24}$).

4. A terminal according to claim 1, characterized in that one of the wires (301) in the cord (300) conveys a reference voltage (V) to said handset (200), and in that said switching means comprises a set of keys (230) associated with a logic circuit, such that each key corresponds to a given combination of voltages on the other wires (302-304), which combination determines the control of a given function.

5. A terminal according to claim 4, characterized in that said cord (300) contains four wires (301-304) and conveys up to eight different control signals.

* * * * *

UNITED STATES PATENT AND TRADEMARK OFFICE
CERTIFICATE OF CORRECTION

PATENT NO. : 5,008,924
DATED : April 16, 1991
INVENTOR(S) : Jacques Guichard, et al It is certified that error appears in the above-indentified patent and that said Letters Patent is hereby corrected as shown below:

On title page, item

[73] Assignee    after "Etat Francais"    insert --représenté par le Ministre des Postes, télécommunications et de l'Espace (CNET)--

Signed and Sealed this

Eighteenth Day of October, 1994

Attest:

BRUCE LEHMAN

*Attesting Officer*    *Commissioner of Patents and Trademarks*